United States Patent Office 3,152,915
Patented Oct. 13, 1964

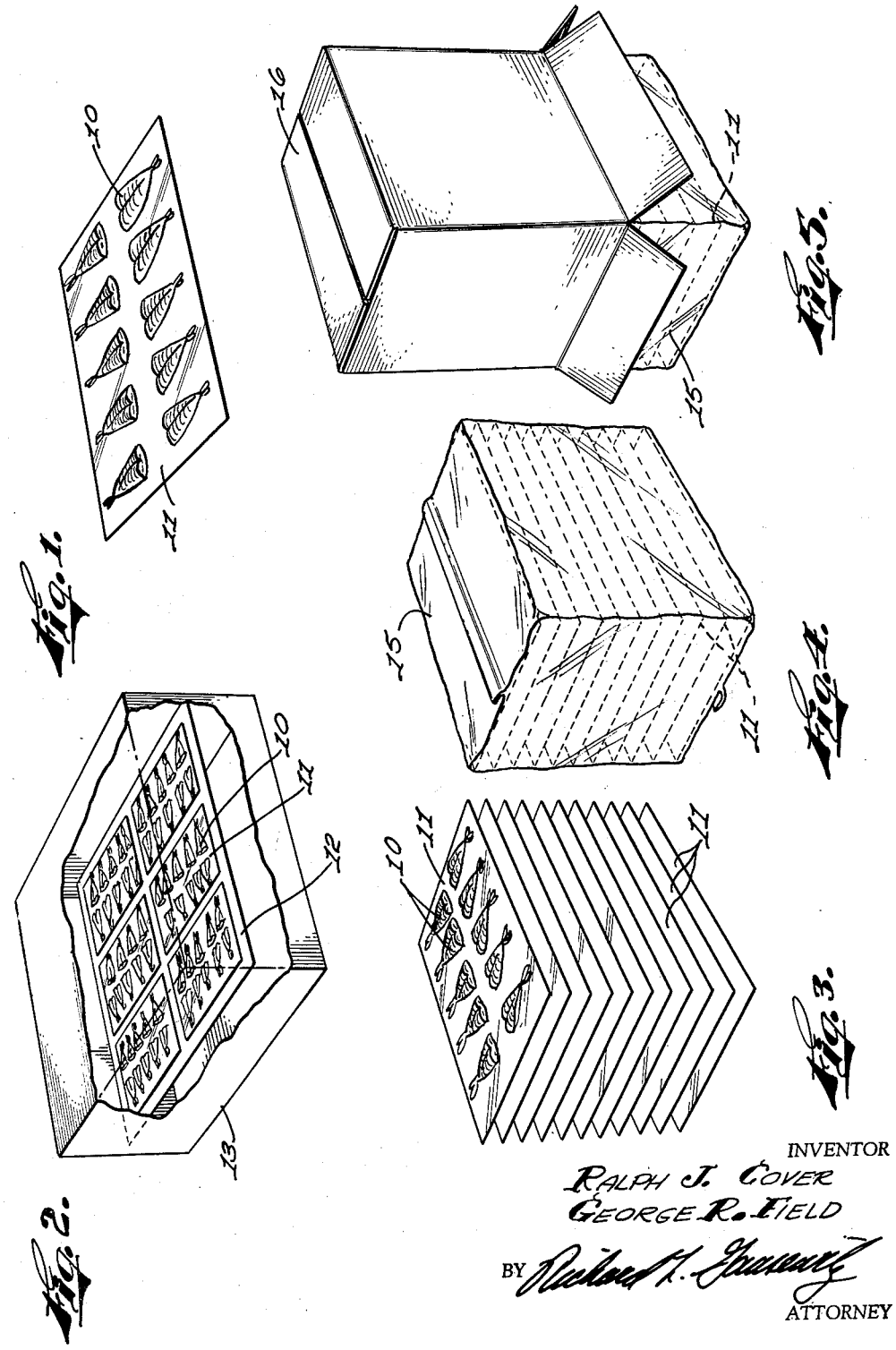

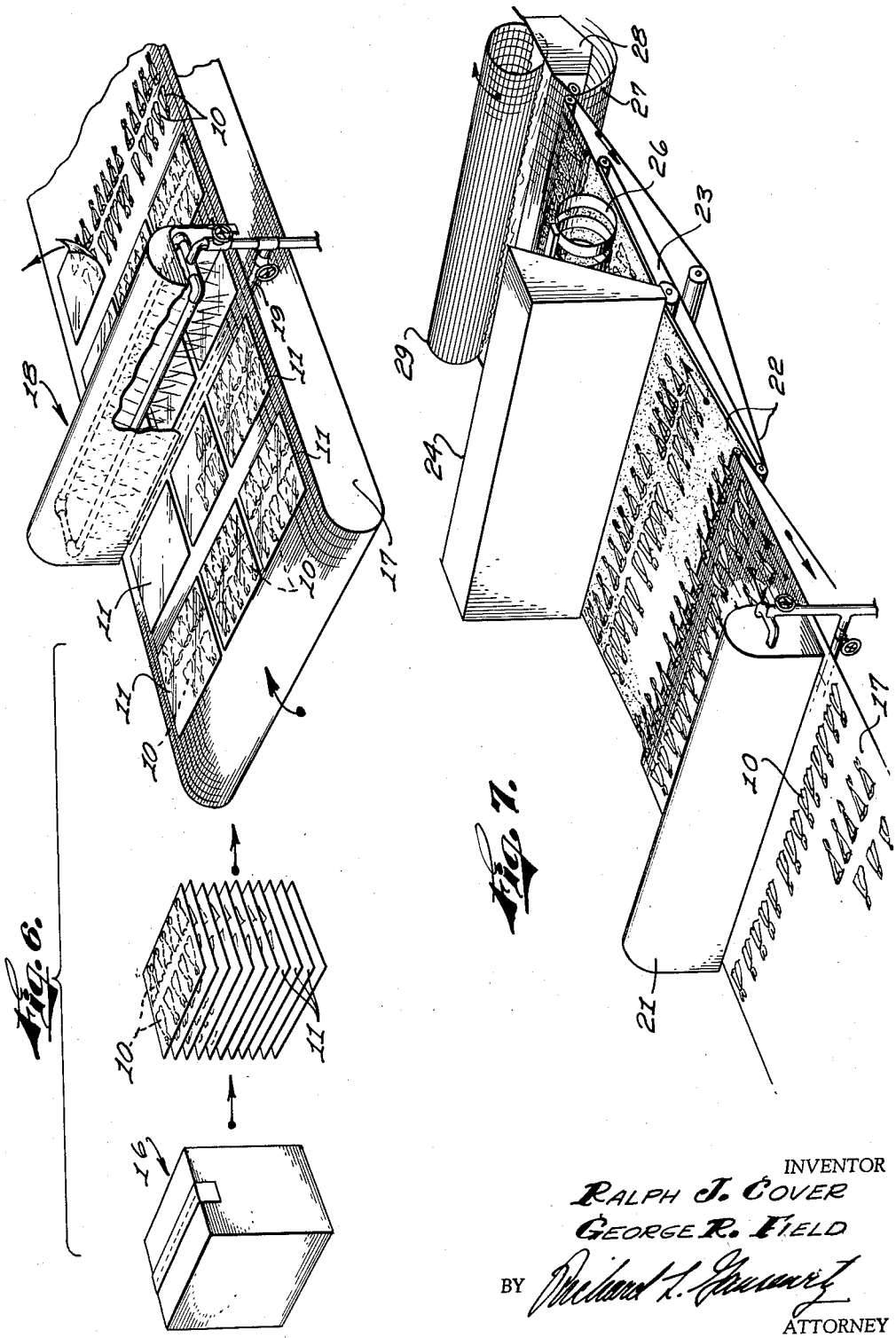

3,152,915
METHOD OF FREEZING, PACKING AND BREADING SHRIMP, AND ARTICLE RESULTING THEREFROM
Ralph J. Cover, Stanton, Calif. (11601 Court Lane, Anaheim, Calif.), and George R. Field, 14101 Booney Lane, Garden Grove, Calif.
Continuation of application Ser. No. 20,481, Apr. 6, 1960. This application July 29, 1963, Ser. No. 308,046
14 Claims. (Cl. 99—195)

This invention relates to a method of freezing and packing shrimp, and subsequently breading the same. The invention also relates to a product resulting from the freezing and packing portions of said method. This is a continuation of our co-pending patent application Serial No. 20,481, filed April 6, 1960, for a Method of Freezing, Packing and Breading Shrimp, and Article Resulting Therefrom.

In accordance with conventional methods of freezing, packing and breading at least partially cleaned shrimp, a mass of shrimp are first disposed in closely-packed relationship in a pan which is then filled with water and frozen solid. The resulting block of ice, containing the frozen shrimp, is then shipped to a factory where the block is thawed completely so that the shrimp may be separated and then subjected to breading or other operations. Such conventional method not only increases the freezing time at the packing station, so that the shrimp are not truly quick-frozen, but also has the effect of greatly increasing the shipping weight and expense. Furthermore, and even more importantly, such method greatly increases the cost of operations at the breading station, and results in a finished product having decreased quality. When the block and shrimp are completely thawed, the shrimp at the outer portions of the block tend to disintegrate. Even after the block is entirely thawed, the resulting shrimp must be manually and individually positioned on belts or the like employed in the breading operation, thus greatly increasing the labor cost. Since the shrimp is frequently re-frozen after breading, it will be understood that the shrimp has been frozen twice before it reaches the consumer, with resulting deterioration in quality.

In view of the above and other factors characteristic of present methods of freezing and packing shrimp, and subsequently breading the same, it is an object of the present invention to provide a method of freezing and packing shrimp in such manner that shipping costs are reduced, and in such manner that there is no necessity for thawing, re-handling and re-freezing the shrimp at the breading station.

A further object of the invention is to provide a method of quick-freezing and packing shrimp, shipping the shrimp to another location, and unpacking and breading the shrimp without the necessity of substantial manual handling operations during unpacking and breading, and without the necessity of re-freezing the shrimp at the breading station.

A further object of the invention is to provide a method of freezing and packing shrimp in such manner that it will not deteriorate even though completely cleaned and "butterflied" at the packing station, and in such manner that it may be processed at a subsequent time without the necessity of thawing the same.

Another object is to provide a product comprising an air-tight container of frozen shrimp packed in predetermined arrangement on suitable supporting sheets of material.

These and other objects and advantages of the invention will be more fully set forth in the following specification and claims, considered in connection with the attached drawings to which they relate.

In the drawings:

FIGURE 1 is a perspective view schematically indicating a plurality of shrimp as oriented on a sheet of material prior to freezing;

FIGURE 2 is a schematic perspective view illustrating a plurality of shrimp-supporting sheets mounted on a tray in a freezer, the freezer being schematically indicated in dashed or phantom lines;

FIGURE 3 is a perspective view illustrating a plurality of sheets of shrimp after stacking thereof subsequent to the freezing step;

FIGURE 4 is a perspective view illustrating the mounting of a plastic bag around the stack of sheets;

FIGURE 5 is a perspective view illustrating the disposing of the bag in a shipping container;

FIGURE 6 is a compound perspective view illustrating the unpacking of the stack of sheets, the disposing of the individual sheets on a conveyor belt, and the heating of the sheets to permit separation thereof from the individual shrimp which are then properly oriented on the belt; and FIGURE 7 is a view schematically illustrating the breading of the shrimp thus properly oriented.

The method will be described in connection with at least partially cleaned shrimp 10 which has been peeled, deveined and "butterflied". Such shrimp is the most difficult to pack, ship and handle without deterioration, and with a minimum of manual labor. It is to be understood, however, that the method (or parts thereof) also applies to shrimp in other conditions, for example shrimp which has been merely de-headed, or shrimp which has been peeled and deveined without being butterflied.

Referring to FIGURE 1, the first step in the method (after the peeling, deveining and butterflying steps) comprises disposing a plurality of shrimp 10 in flatwise engagement with one side of a supporting sheet 11 of suitable material. The shrimp are disposed in a predetermined manner, namely in rows, adapted to greatly facilitate performance of the breading step to be described hereinafter. It is an important feature of the method that the shrimp are disposed on the supporting sheet 11 in such manner that there is no substantial point of contact between each shrimp and each adjacent shrimp. The shrimp is moist or wet as a result of preceding cleaning steps, because it exudes juices after being peeled. Unpeeled shrimp may be moistened in any suitable manner.

As the next step in the method, a plurality of shrimp-supporting sheets 11 are disposed on a rigid tray 12. The tray is then inserted into a quick-freezer apparatus, indicated schematically at 13 and embodying means for effecting circulation of cold air, in such manner that each shrimp 10 contacts nothing but the sheet 11 therefor. Thus, it is important to the present method that the sheets 11 be disposed at different portions of the tray 12, instead of being stacked in contact with other sheets. In order that the quality and edibility of the shrimp will be maximized, the tray is preferably maintained in the freezer apparatus 13 for a period of time barely sufficient to effect freezing of the shrimp, for example for twenty minutes when the temperature is zero degrees Fahrenheit. Additional freezing time is undesirable, but such additional freezing time has no bearing on the adherence of the shrimp to the supporting sheet 11 or to other portions of the present process. The shrimp thus frozen adheres to the respective sheets 11 due to the above-indicated fact that the shrimp is moist when disposed thereon, so that the water (juice) freezes and provides an adhesive function.

Referring next to FIGURE 3, a plurality of sheets 11 of frozen shrimp 10, for example twenty-four such sheets, are stacked in contact with each other to provide a mass of shrimp. Such shrimp are in parallel layers, in alternation with sheets 11. An air-impervious bag 15, for example formed of polyethylene, is then disposed over the mass of shrimp as illustrated in FIGURE 4, following which the mouth of the bag is closed by a heat-sealing operation so that there may be no leakage of air into or out of the bag 15. Loss of moisture, and freezer burn during subsequent cold storage, are thus prevented. A shipping container 16 (FIGURE 5) is then disposed over the bag 15 and is closed in conventional manner. The described combination of the bag 15 and shipping container or box 16 may be termed an "air-impervious shipping container."

The containers 16 of shrimp are then stored under subfreezing refrigerated conditions, being normally shipped to another portion of the country or to a different country. It is emphasized that the shipping weight is minimized since there is no mass of water surrounding the shrimp, and since the sheets 11 are relatively light in weight.

Referring next to FIGURE 6, the shipping container 16 is illustrated as disposed at a factory or station where a breading operation is to be performed. Such container is opened, the bag 15 is removed, and the individual sheets 11 are separated from the stack thereof and disposed side-by-side on a conveyor belt 17 which is preferably formed of wire links or other water-permeable construction.

It is emphasized that each sheet 11 may be separated from the stack thereof without the necessity of any thawing step. This is because, although each shrimp 10 clings to the sheet 11 on which it was frozen, it does not cling to the next adjacent sheet in the stack. Separation of the sheets, and mounting of the frozen shrimp on the belt, are thus accomplished with a minimum of labor.

The sheets 11 are so disposed (in properly oriented relationship) on the belt 17 that the shrimp adhering thereto are beneath the sheets. The sheets are then passed beneath a device 18 adapted to spray them with water, warm air, etc., and thereby effect melting of the ice which binds the shrimp thereto. Any suitable heating means may be employed for this step, and (in order to maintain quality at a maximum) is only utilized for a sufficient period of time to melt the ice which binds the shrimp to the sheets. It is emphasized that the shrimp are not thawed internally, but only slightly at one surface, in order that deterioration in quality will not result. If desired, a second spray device 19, disposed beneath the device 18, may be employed to direct sprays of water upwardly through the belt and against the undersides of the shrimp.

The sheets 11 may then be readily lifted from the shrimp 10 (right side of FIGURE 6), to thereby leave rows of shrimp on the belt 17 in perfectly oriented relationship for the breading operation to be described relative to FIGURE 7. It is emphasized that no substantial time was required for thawing, and substantially no labor was required for disposing the shrimp in perfectly oriented relationship on the belt. Furthermore, there is no great quantity of water present such as would occur due to thawing of blocks of ice containing shrimp. Since the shrimp remain frozen, they may be rapidly breaded, repacked and disposed in a freezing apparatus to result in breaded shrimp which has only been frozen once instead of twice.

Referring next to FIGURE 7, the shrimp 10 on belt 17 are then passed through a suitable spray apparatus 21 which applies water to the upper and lower sides thereof. The shrimp then move off of the conveyor belt 17, but without turning over or changing their properly oriented conditions, onto a second conveyor belt 22. Belt 22 forms part of a breading apparatus, and incorporates suitable means (including a central belt element 23) for applying meal or bread crumbs to the undersides of the shrimp. In addition, the shrimp on belt 22 are passed beneath a hopper apparatus 24 which drops substantial quantities of crumbs or meal onto the upper sides of the shrimp.

After the shrimp have thus been thoroughly breaded, they are passed beneath a suitable vibrator apparatus 26 which effects removal of excess bread or meal. Such excess falls through openings in the belt 22, which is of perforated construction.

The breaded shrimp 10 then passes, again without changing its oriented condition, onto a conveyor belt apparatus 27 which moves the shrimp through batter disposed in a suitable container 28. A roller means 29 is provided in the container, above the belt 27, to prevent the shrimp from floating off the belt and thus changing their properly oriented positions thereon.

The shrimp 10 having been thus coated with bread (which term also denotes cracker crumbs, meal, etc.) and batter, it is repacked in conventional manner and stored under conditions which maintain the same in frozen state until use. It is again pointed out that all of these steps are (in order to maintain quality at a maximum) performed sufficiently rapidly to prevent the shrimp from becoming thawed except at the surface thereof. Thus, the shrimp is not frozen twice between the time it is cleaned until it is used, being instead frozen only once.

The material forming each supporting sheet 11 is preferably water-resistant (so that it will not disintegrate when wet), sufficiently light and cheap that it may be economically shipped and then discarded, and sufficiently heavy that it will support (when the sheet is lifted) the weight of a substantial number of shrimp without tearing. The material must be such that the shrimp will cling firmly thereto due to freezing of water or shrimp juices, and must also be such that the shrimp will readily separate therefrom after a brief melting period. Such sheets may be termed, in the present specification and claims, "sheets of water-resistant ice-adherent material." In particular, sheets 11 are preferably formed of heavy brown kraft paper which has been impregnated on both sides with wax, by the dip method. This is one form of waxed paper. The sheets must not be excessively coated, particularly with wax containing certain plastics, or the shrimp will not cling thereto.

It is pointed out that the present method of packing and freezing is also highly useful in connection with shrimp which is not to be breaded. For example, the shrimp may be fed into a cooking apparatus instead of a breading apparatus. Also, small quantities of shrimp packed in accordance with the present method may be shipped to various restaurants and other points of consumption. When, for example, only a few shrimp are required for use, such shrimp may be readily separated from the sheet of paper to which they are frozen, and the shrimp may be employed without the necessity of thawing an entire block of ice.

Various embodiments of the present invention, in addition to what has been illustrated and described in detail, may be employed without departing from the scope of the accompanying claims.

We claim:

1. In a method of freezing and packing shrimp, the steps of providing a sheet of water-resistant ice-adherent material, disposing a plurality of moist and at least partially-cleaned shrimp on said sheet, said shrimp being oriented in spaced relationship from each other with each shrimp contacting said sheet, and freezing said shrimp to prepare the same for storage and shipment and to effect adherence thereof to said sheet due to freezing of the moisture on said shrimp.

2. A method of freezing and packing shrimp, which comprises disposing a plurality of at least partially-cleaned shrimp in moist condition on a thin sheet of light-weight water-resistant ice-adherent material and in flatwise engagement with said sheet, said last-named step being performed in such manner that each shrimp is out of substantial contact with each other shrimp, and maintaining said sheet and the shrimp thereon at a temperature substantially below freezing until said shrimp is frozen and is adhered to said sheet due to freezing of the moisture on said shrimp.

3. A method of freezing and packing shrimp, comprising the steps of disposing a plurality of at least partially-cleaned moist shrimp in engagement with thin sheets of light-weight water-resistant ice-adherent material, maintaining a plurality of said sheets of shrimp at sub-freezing temperature and in spaced relationship whereby upon freezing of said shrimp it adheres to the sheet on which it is disposed due to freezing of the moisture of said shrimp but not to other sheets and the shrimp thereon, and thereafter packing a plurality of said sheets of shrimp in stacked relationship in a storage container.

4. A method of freezing and packing shrimp, comprising the steps of disposing a plurality of peeled and deveined shrimp in moist condition on a thin sheet of water-resistant ice-adherent material in separated relationship relative to each other, quick-freezing said shrimp and effecting adherence thereof to said sheet due to freezing of the moisture on said shrimp, and packing said sheet and shrimp in an air-tight container.

5. The invention as claimed in claim 4, in which said sheet of material is waxed paper.

6. A method of freezing and packing shrimp, comprising the steps of peeling and deveining a plurality of shrimp, disposing said shrimp on a sheet of water-resistant ice-adherent material in flatwise engagement therewith and with each shrimp at least substantially spaced from each other shrimp, quick-freezing said shrimp to effect ice-adherence thereof to said sheets, stacking a plurality of sheets of frozen shrimp subsequent to the freezing step, and disposing said stack of sheets in an air-tight shipping container.

7. A method of freezing and packing shrimp and subsequently breading the same, comprising the steps of disposing a plurality of peeled and deveined shrimp in moist condition on a thin sheet of ice-adherent material and in predetermined relationship, freezing said shrimp and consequently effecting adherence thereof to said sheet, storing said sheet of frozen shrimp under refrigerated conditions to maintain the same frozen, disposing said sheet on a support, raising the temperature of said sheet to effect melting of the ice between said shrimp and said sheet without substantial thawing of the shrimp, removing said sheet from said shrimp to leave said shrimp in said predetermined relationship on said support, and effecting breading of said shrimp thus placed and oriented on said support.

8. A method of freezing and packing shrimp and subsequently breading the same while in frozen condition, comprising the steps of disposing a plurality of peeled and deveined shrimp in moist condition on only one side of a thin sheet of water-resistant ice-adherent material and with each part of each shrimp spaced from each part of each other shrimp, said shrimp being arranged in predetermined oriented positions and in flatwise engagement with said sheet, freezing said shrimp and consequently effecting adherence thereof to said sheet due to freezing of the moisture between said shrimp and said sheet, storing said shrimp and sheet under refrigerated conditions to maintain the same frozen, disposing said shrimp and sheet on a support with said sheet disposed above said shrimp and with said shrimp in engagement with said support, applying heat to the upper side of said sheet for a period of time barely sufficient to melt the moisture between said sheet and said shrimp and permit removal of said sheet from said shrimp, said heat and time period being insufficient to effect substantial thawing of said shrimp, removing said sheet to leave said shrimp exposed on said support in said predetermined oriented positions, and effecting breading of the shrimp thus oriented on said support.

9. The invention as claimed in claim 8, in which said sheet is waxed paper.

10. The invention as claimed in claim 8, in which said freezing step is performed by quick-freezing.

11. A method of breading shrimp, which comprises providing a plurality of sheets of ice-adherent thin material each having a multiplicity of frozen shrimp clinging to one side thereof in predetermined arrangement and due to ice bonds therewith, disposing said sheets on a support in predetermined arrangement, melting the ice bonds between said sheets and said shrimp without substantial thawing of the shrimp, removing said sheets from said shrimp while leaving said shrimp in said predetermined arrangement, and breading said shrimp thus arranged.

12. A packaged product, which comprises an air-impervious container containing a plurality of thin sheets of water-resistant material disposed in spaced, generally parallel relationship, said material being adapted to maintain shrimp oriented thereon due to ice bonds between said shrimp and said sheets, and a plurality of layers of quick-frozen cleaned shrimp, said layers being respectively disposed between said sheets, the shrimp in the layers between each two adjacent sheets being in flatwise engagement with at least one thereof in predetermined oriented positions and being ice bonded to only said one of said adjacent sheets.

13. The invention as claimed in claim 12, in which said container is a sealed polyethylene bag.

14. The invention as claimed in claim 12, in which said material is brown kraft paper impregnated with wax by the dip method.

References Cited in the file of this patent

UNITED STATES PATENTS

| | | |
|---|---|---|
| 2,505,384 | Burstiner | Apr. 25, 1950 |
| 2,740,721 | Hice et al. | Apr. 3, 1956 |
| 2,920,968 | Grandy | Jan. 12, 1960 |

OTHER REFERENCES

"Refrigerating Engineering," February 1954, p. 46, article entitled Packaging and Wrapping Materials.